United States Patent
Ogahara et al.

(10) Patent No.: US 12,151,764 B2
(45) Date of Patent: Nov. 26, 2024

(54) BODY POSTURE DETECTION DEVICE AND STRADDLE TYPE VEHICLE

(71) Applicant: HONDA MOTOR CO., LTD., Tokyo (JP)

(72) Inventors: Atsushi Ogahara, Tokyo (JP); Hiroshi Kurata, Tokyo (JP); Kenji Kitahara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 293 days.

(21) Appl. No.: 17/702,954

(22) Filed: Mar. 24, 2022

(65) Prior Publication Data

US 2022/0212742 A1    Jul. 7, 2022

Related U.S. Application Data

(63) Continuation of application No. PCT/JP2020/034631, filed on Sep. 14, 2020.

(30) Foreign Application Priority Data

Sep. 27, 2019   (JP) .................. 2019-177713

(51) Int. Cl.
  *B62J 45/412*    (2020.01)
  *B62J 45/414*    (2020.01)
(52) U.S. Cl.
  CPC ........... *B62J 45/412* (2020.02); *B62J 45/414* (2020.02)
(58) Field of Classification Search
  CPC ..... B62J 45/412; B62J 45/414; B62J 45/4151
  See application file for complete search history.

(56) References Cited

U.S. PATENT DOCUMENTS 6,718,248 B2 *  4/2004  Lu ................ B60G 17/0195
                                          340/440
7,366,602 B2 *  4/2008  Xu ................ B60R 21/0132
                                          701/91

(Continued)

FOREIGN PATENT DOCUMENTS

DE    112005003266 T5    9/2008
DE    102012016108 A1    1/2014

(Continued)

OTHER PUBLICATIONS

Indian Office Action for Indian Patent Application No. 202217020672 mailed on Sep. 22, 2022.

(Continued)

*Primary Examiner* — Tung S Lau
(74) *Attorney, Agent, or Firm* — Thomas | Horstemeyer, LLP

(57) ABSTRACT

A body posture detection device comprises: a correction value calculation unit that sequentially calculates a correction value for estimating a roll angle of a vehicle body on the basis of a variable correction coefficient set according to a determination of a state determination unit and detection values of a speed sensor and a detection unit; and a roll angle estimation value calculation unit that calculates an estimation value of a current roll angle of the vehicle body by integrating a value obtained by correcting an estimation value of a roll angular velocity on the basis of the correction value. The correction value calculation unit sets the variable correction coefficient so as to reduce the correction value when the parameter exceeds a threshold.

11 Claims, 5 Drawing Sheets

(56) References Cited

U.S. PATENT DOCUMENTS

| | | | |
|---|---|---|---|
| 7,885,750 B2 * | 2/2011 | Lu | B60W 40/076 180/197 |
| 7,966,127 B2 | 6/2011 | Ono et al. | |
| 8,121,758 B2 * | 2/2012 | Lu | B60T 8/1755 280/5.506 |
| 8,155,798 B2 | 4/2012 | Seiniger et al. | |
| 8,321,088 B2 * | 11/2012 | Brown | B60W 50/035 701/72 |
| 8,346,433 B2 * | 1/2013 | Lu | B60T 8/17554 280/735 |
| 8,380,391 B2 | 2/2013 | Baino | |
| 8,788,171 B2 | 7/2014 | Ono et al. | |
| 8,939,083 B1 * | 1/2015 | Desch | F42C 15/24 102/222 |
| 9,709,391 B2 | 7/2017 | Bando et al. | |
| 9,914,461 B2 | 3/2018 | Okoshi et al. | |
| 10,138,819 B2 | 11/2018 | Matsuda | |
| 10,502,567 B2 | 12/2019 | Fujii | |
| 11,305,692 B2 | 4/2022 | Matsui et al. | |
| 2006/0184299 A1 * | 8/2006 | Wu | B60G 17/005 280/5.502 |
| 2008/0097699 A1 | 4/2008 | Ono | |
| 2009/0222164 A1 | 9/2009 | Seiniger et al. | |
| 2010/0168958 A1 | 7/2010 | Baino | |
| 2011/0040464 A1 | 2/2011 | Ono et al. | |
| 2011/0130926 A1 * | 6/2011 | Lu | B60W 40/072 701/1 |
| 2015/0274175 A1 | 10/2015 | Okoshi et al. | |
| 2015/0308827 A1 | 10/2015 | Fujii | |
| 2016/0069675 A1 | 3/2016 | Bando et al. | |
| 2016/0160763 A1 | 6/2016 | Matsuda | |
| 2020/0398752 A1 | 12/2020 | Matsui et al. | |

FOREIGN PATENT DOCUMENTS

| | | |
|---|---|---|
| DE | 102016220559 A1 | 4/2018 |
| DE | 102018202664 A1 | 8/2019 |
| DE | 102006061483 B4 | 1/2024 |
| JP | 2010-149681 A | 7/2010 |
| JP | 5173854 B2 | 4/2013 |
| JP | 2015-189300 A | 11/2015 |
| JP | 2015-209106 A | 11/2015 |
| JP | 6146906 B2 | 6/2017 |
| JP | 6352790 B2 | 7/2018 |
| JP | 6386839 B2 | 9/2018 |
| WO | 2019/168157 A1 | 9/2019 |
| WO | 2021/060038 A1 | 4/2021 |

OTHER PUBLICATIONS

International Search Report for PCT/JP2020/034631 mailed Dec. 1, 2020 with partial English Translation.

Indian Office Action for Indian Patent Application No. 202217020672 mailed on Jun. 15, 2024.

German Office Action for German Patent Application No. 112020004554.4 mailed on Apr. 26, 2024.

* cited by examiner

BODY POSTURE DETECTION DEVICE AND STRADDLE TYPE VEHICLE

CROSS-REFERENCE TO RELATED APPLICATION(S)

This application is a continuation of International Patent Application No. PCT/JP2020/034631 filed on Sep. 14, 2020, which claims priority to and the benefit of Japanese Patent Application No. 2019-177713 filed on Sep. 27, 2019, the entire disclosure of which is incorporated herein by reference.

BACKGROUND OF THE INVENTION

Field of the Invention

The present invention relates to a body posture detection device and a straddle type vehicle that estimate a roll angle of a vehicle body.

Description of the Related Art

It is often necessary to sequentially estimate the roll angle (inclination angle in roll direction) of a vehicle body such as a motorcycle in real time. For example, Japanese Patent Laid-Open No. 2010-149681 proposes a technique for estimating the roll angle (bank angle in description of Japanese Patent Laid-Open No. 2010-149681) of a vehicle body in order to control an irradiation range of a headlamp of a motorcycle.

In the technique proposed in Japanese Patent Laid-Open No. 2010-149681, an estimation value of the roll angle is calculated using, as a convergence target value, a roll angle value in a steady state in which a moment in the roll direction due to centrifugal force and a moment in the roll direction due to gravity are balanced.

However, in the calculation processing of the estimation value in Japanese Patent Laid-Open No. 2010-149681, in an unsteady state (transient state) such as a drift driving state or a jumping state of the vehicle, a physical relationship established in the steady state, such as the relationship of acceleration acting in a lateral direction of the vehicle, is not established. For this reason, when the calculation processing of the roll angle estimation value is performed on the basis of a correction value in which an estimation value in a transient state is taken into consideration, there may be a case where error components are accumulated and the error of the roll angle estimation value may easily increase.

The present invention provides a body posture detection device capable of calculating a correction value using a variable correction coefficient set according to a traveling state of a vehicle and estimating a roll angle on the basis of the calculated correction value.

SUMMARY OF THE INVENTION

According to one aspect of the present invention, there is provided a body posture detection device that sequentially estimates a roll angle of a vehicle body of a straddle type vehicle having an x axis extending in a longitudinal direction of the vehicle body, a y axis extending in a vehicle width direction of the vehicle body, and a z axis extending in a vertical direction of the vehicle body as a coordinate system fixed to the vehicle body, the body posture detection device comprising:

a speed sensor that detects a speed of the vehicle body in a traveling direction;

a detection unit including a plurality of acceleration sensors corresponding to axes that detect translational acceleration in directions of the x axis, the y axis, and the z axis, and a plurality of angular velocity sensors corresponding to axes that detect angular velocity in a direction around the x axis and angular velocity in a direction around the z axis;

a pitch angle estimation unit that sequentially estimates a pitch angle of the vehicle body;

a roll angular velocity estimation unit that sequentially estimates a roll angular velocity of the vehicle body;

a state determination unit that determines a traveling state of the straddle type vehicle by comparing a parameter calculated on the basis of a detection value detected by the detection unit with a threshold;

a correction value calculation unit that sequentially calculates a correction value for estimating a roll angle of the vehicle body on the basis of a variable correction coefficient set according to the determination of the state determination unit and detection values of the speed sensor and the detection unit; and a roll angle estimation value calculation unit that calculates an estimation value of a current roll angle of the vehicle body by integrating a value obtained by correcting the estimation value of the roll angular velocity on the basis of the correction value, wherein the correction value calculation unit sets the variable correction coefficient so as to reduce the correction value when the parameter exceeds the threshold.

According to the present invention, it is possible to calculate a correction value using a variable correction coefficient set according to a traveling state of a vehicle and estimate a roll angle on the basis of the calculated correction value.

DESCRIPTION OF THE EMBODIMENTS

Hereinafter, an embodiment will be described in detail with reference to the accompanying drawings. Note that the following embodiment does not limit the invention according to the claims, and not all combinations of features described in the embodiment are essential to the invention.

Figure 1:
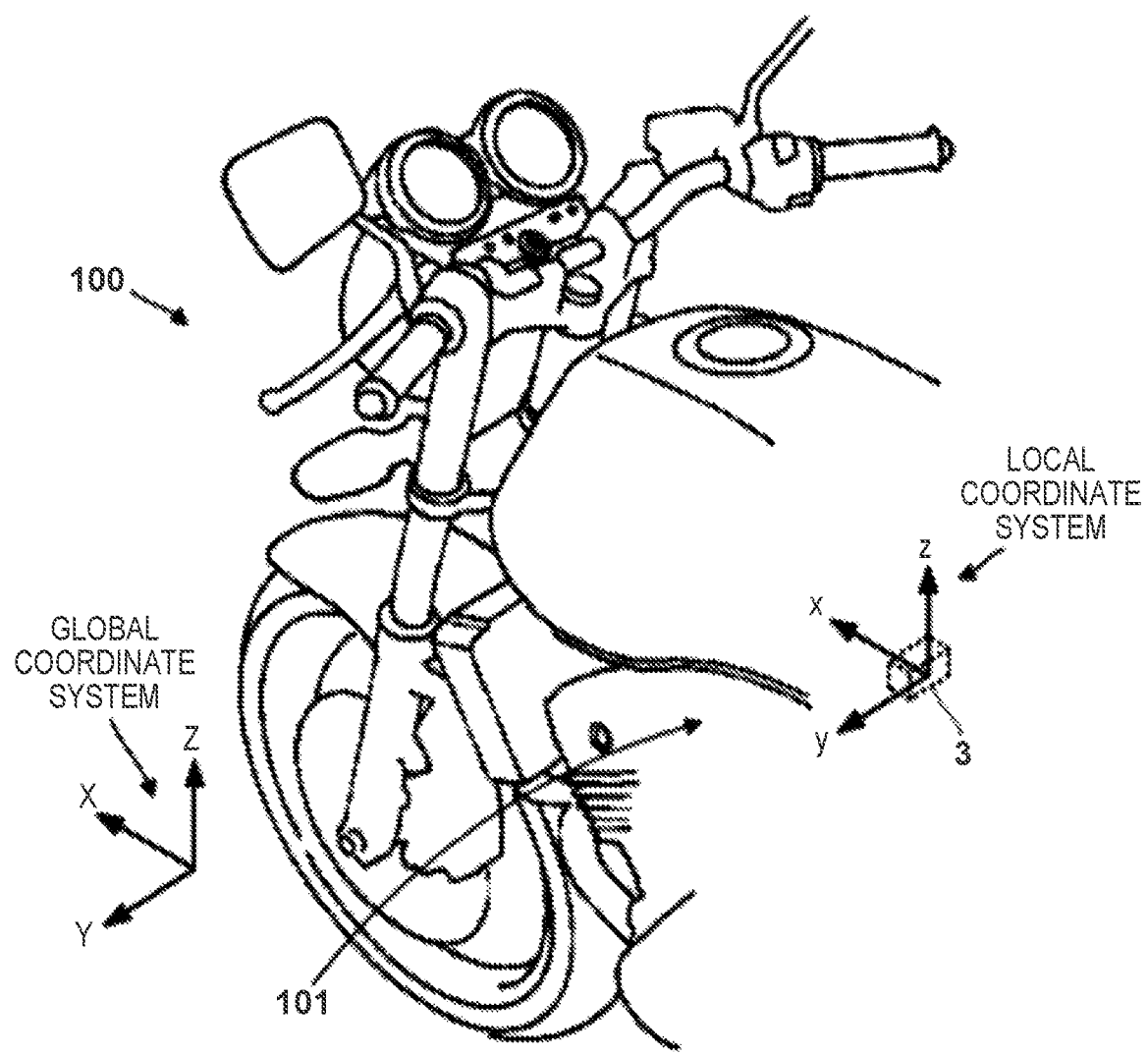
FIG. 1 is a perspective view illustrating a part of a motorcycle on which a body posture detection device according to an embodiment is mounted.

FIG. 1 is a perspective view illustrating a part of a motorcycle on which a body posture detection device according to an embodiment is mounted. As illustrated in FIG. 1, a body posture detection device 1 of the present embodiment as a device that estimates the roll angle of a vehicle body 101 of a motorcycle 100 (straddle type vehicle) is mounted on the motorcycle 100.

Here, a local coordinate system and a global coordinate system illustrated in FIG. 1, which are assumed in the following description of the present embodiment, will be described.

The local coordinate system is a coordinate system fixed with respect to the vehicle body 101 (coordinate system that moves integrally with vehicle body 101). As illustrated in FIG. 1, the local coordinate system is defined as an xyz orthogonal coordinate system in which an axis extending in the longitudinal direction of the vehicle body 101 is an x axis (first axis), an axis extending in the vehicle width direction of the vehicle body 101 is a y axis (second axis), and an axis extending in the vertical direction of the vehicle body 101 is a z axis (third axis).

Additionally, the global coordinate system is an inertial coordinate system for expressing the moving state of the vehicle body 101 viewed from the travel environment of the motorcycle 100 (movement environment of vehicle body 101). The global coordinate system is defined as an XYZ orthogonal coordinate system in which a horizontal axis in the same direction as an axis obtained by projecting the x axis of the local coordinate system on a horizontal plane is an X axis, a horizontal axis in the same direction as an axis obtained by projecting the y axis of the local coordinate system on a horizontal plane is a Y axis, and an axis in the vertical direction (gravity direction) is a Z axis.

In this case, in a state where the motorcycle 100 is stopped in a straightline-traveling posture on a horizontal plane, the x-axis direction, the y-axis direction, and the z-axis direction of the local coordinate system coincide with the X-axis direction, the Y-axis direction, and the Z-axis direction of the global coordinate system, respectively. The global coordinate system is a coordinate system that moves with the movement of the vehicle body 101, and is not a coordinate system that is always fixed to the road surface.

Additionally, the roll angle, the pitch angle, and the yaw angle of the vehicle body 101 are expressed as an angle around the X axis, an angle around the Y axis, and an angle around the Z axis of the global coordinate system, respectively. In the present embodiment, the roll angle, the pitch angle, and the yaw angle of the vehicle body 101 are angles expressed by Euler angles. Based on the above, the body posture detection device 1 will be described in detail.

Functional Configuration of Body Posture Detection Device

Figure 2:
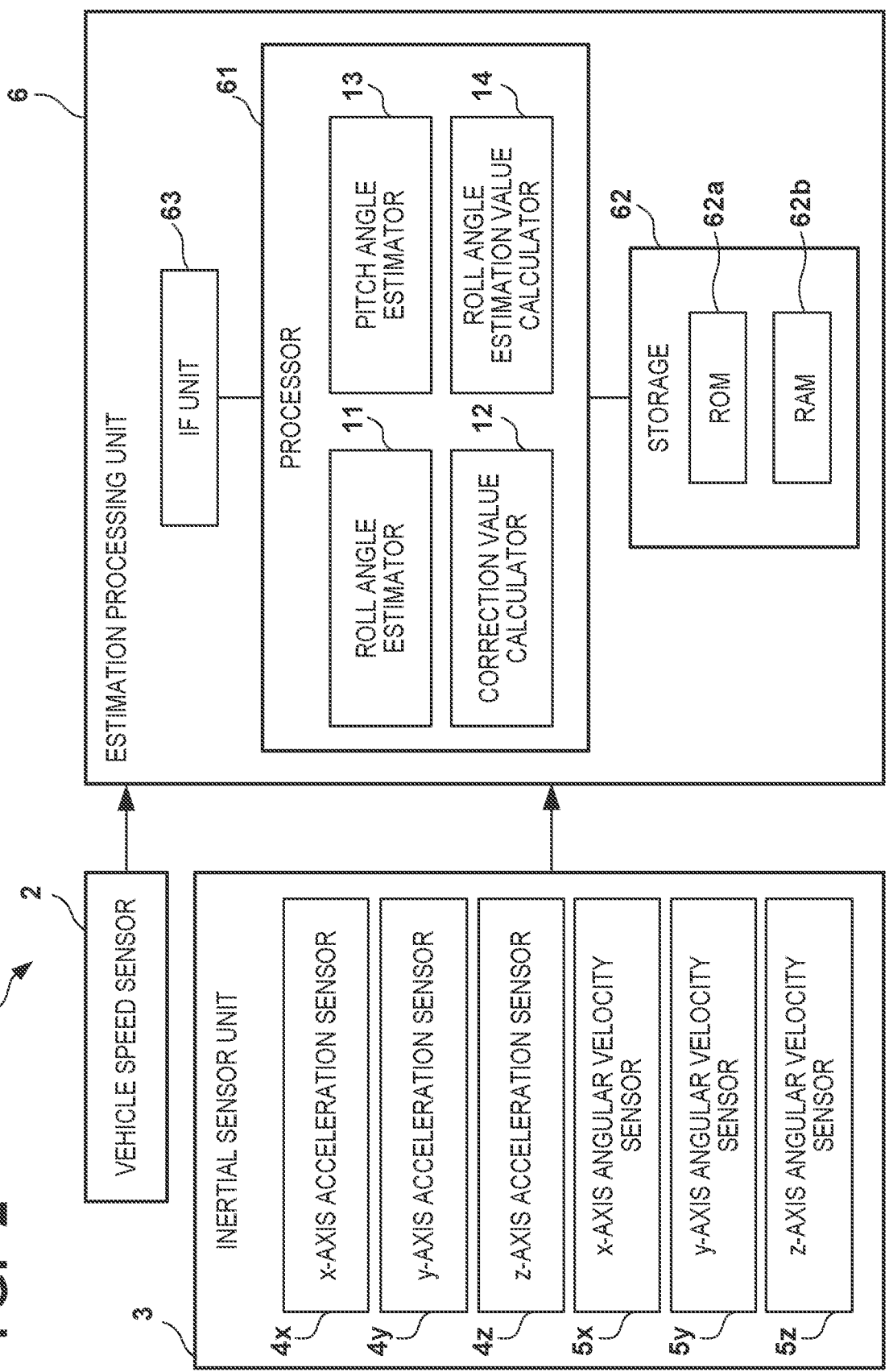
FIG. 2 is a diagram illustrating a functional configuration of the body posture detection device according to the embodiment.

FIG. 2 is a diagram illustrating a functional configuration of the body posture detection device 1 according to the embodiment. As illustrated in FIG. 2, the body posture detection device 1 includes a vehicle speed sensor 2 that detects a vehicle speed V as a traveling direction speed of the vehicle body 101, an inertial sensor unit 3 that detects an acceleration and an angular velocity generated in the vehicle body 101, and an estimation processing unit 6 that estimates the roll angle, for example, on the basis of detection signals input from the vehicle speed sensor 2 and the inertial sensor unit 3.

The vehicle speed sensor 2 includes, for example, a rotational speed sensor such as a rotary encoder that outputs a detection signal corresponding to the rotational speed of a rear wheel of the motorcycle 100. In this case, the wheel speed of the rear wheel corresponding to the detection value of the rotational speed of the rear wheel is obtained as the detection value of the vehicle speed.

Note that the vehicle speed sensor 2 may detect the rotational speeds of both the front wheel and the rear wheel, and calculate the vehicle speed on the basis of the detection values of the rotational speeds. The vehicle speed sensor 2 may be a sensor of another form (e.g., vehicle speed sensor using GPS, and the like) as long as the sensor can detect the traveling direction speed of the vehicle body 101.

The inertial sensor unit 3 (inertial measurement unit: IMU) is a sensor unit capable of detecting the behavior of the motorcycle 100 by detecting the acceleration and the angular velocity generated in the vehicle body 101. As illustrated in FIG. 2, the inertial sensor unit 3 can be disposed at any appropriate position of the vehicle body 101, such as near the center of gravity of the motorcycle 100. The inertial sensor unit 3 includes, as sensors that detect translational acceleration, an x-axis acceleration sensor 4x that detects translational acceleration (hereinafter referred to as x-axis acceleration) in the x-axis direction (longitudinal direction of motorcycle 100) of the local coordinate system, a y-axis acceleration sensor 4y that detects translational acceleration (hereinafter referred to as y-axis acceleration) in the y-axis direction (lateral direction of motorcycle 100), and a y-axis acceleration sensor 4z that detects translational acceleration (hereinafter referred to as z-axis acceleration) in the z-axis direction (vertical direction of motorcycle 100).

Additionally, the inertial sensor unit 3 includes, as sensors that detect angular velocity, an x-axis angular velocity sensor 5x that detects angular velocity (hereinafter referred to as x-axis angular velocity) around the x axis, a y-axis angular velocity sensor 5y that detects angular velocity (hereinafter referred to as y-axis angular velocity) around the y axis, and a z-axis angular velocity sensor 5z that detects angular velocity (hereinafter referred to as z-axis angular velocity) around the z axis.

The estimation processing unit 6 includes a processor 61 including a processor such as a CPU, a storage 62 including components such as a RAM 62b that stores a result (previous value) of sequential arithmetic processing and a ROM 62a that stores a table 600 (FIG. 6) to be described later, and an electric control unit (ECU) including an interface unit 63 (I/F unit) that transmits and receives signals between an external device including the vehicle speed sensor 2 and the inertial sensor unit 3 and the processor 61. The estimation processing unit 6 is mounted at an arbitrary appropriate position of the motorcycle 100. Note that the estimation processing unit 6 may include a plurality of electronic control units that can communicate with each other.

The estimation processing unit 6 includes a roll angular velocity estimator 11, a correction value calculator 12, a pitch angle estimator 13, and a roll angle estimation value calculator 14 as functions implemented by a program mounted in the storage 62 or functional configurations implemented by a hardware configuration.

Figure 3:
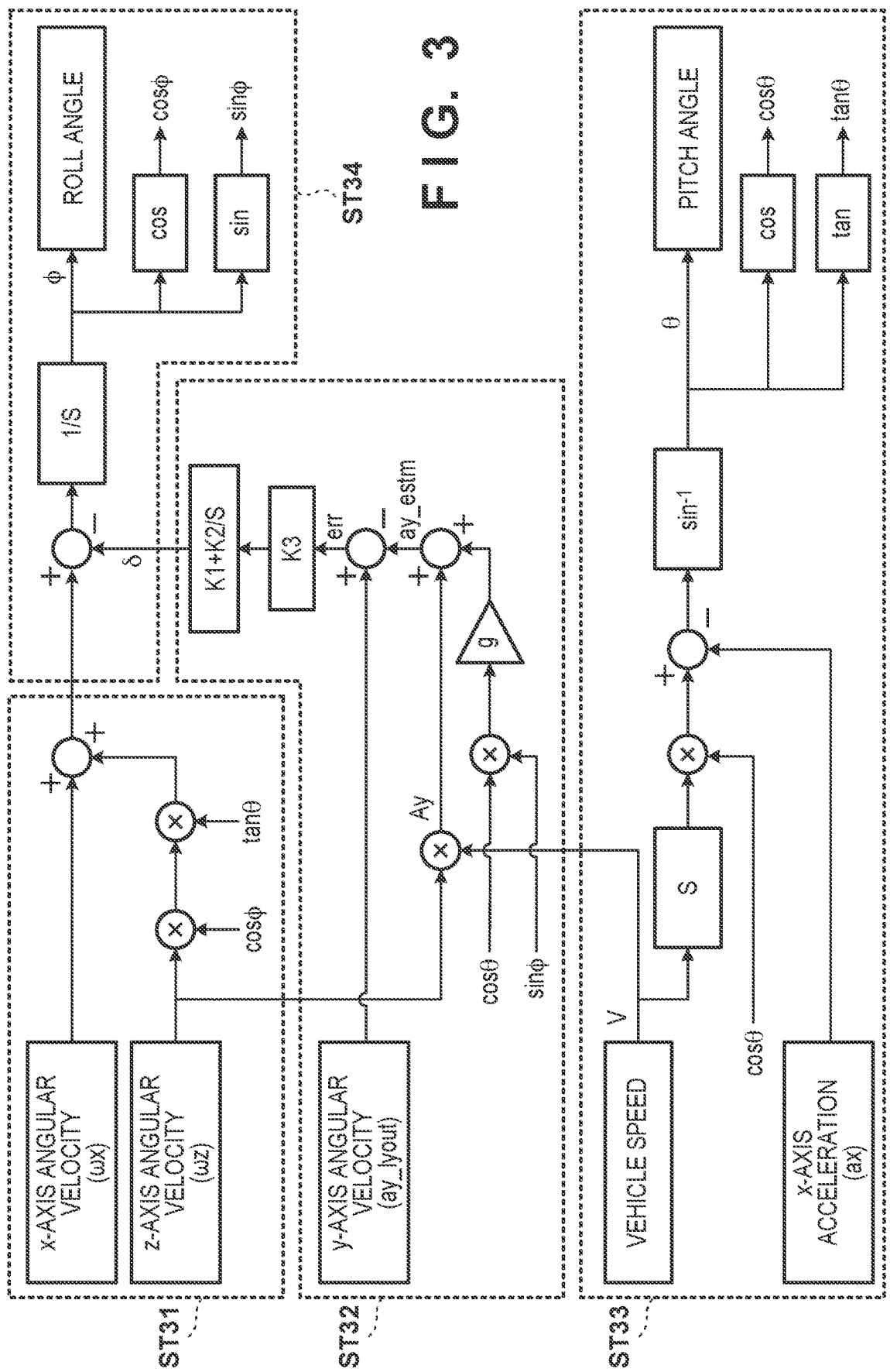
FIG. 3 is a block diagram for describing processing contents of the body posture detection device.

FIG. 3 is a block diagram for describing the contents of processing of each functional configuration in the estimation processing unit 6. In FIG. 3, "S" indicates differential operation, and "1/S" indicates integral operation.

Roll Angular Velocity Estimator 11

ST31 in FIG. 3 is a block diagram illustrating processing contents of the roll angular velocity estimator 11. An x-axis angular velocity ($\omega x$), a z-axis angular velocity ($\omega z$), $\cos \varphi$, and $\tan \theta$ are input to the roll angular velocity estimator 11. The roll angular velocity estimator 11 estimates a roll angular velocity $\varphi$dot (time rate of change of roll angle $\varphi$) of the vehicle body 101 on the basis of the input signal. Here, the x-axis angular velocity ($\omega x$) and the z-axis angular velocity ($\omega z$) are based on detection signals detected by the x-axis angular velocity sensor 5x and the z-axis angular velocity sensor 5z of the inertial sensor unit 3.

Additionally, cos φ is a cosine function value based on the previous roll angle (φ) estimated by the arithmetic processing of the roll angle estimation value calculator 14 in the previous calculation processing cycle. Additionally, tan θ is a tangent function value based on the previous pitch angle (θ) estimated by the arithmetic processing of the pitch angle estimator 13 in the previous arithmetic processing cycle.

When processing in the roll angular velocity estimator 11 is expressed by a formula, the roll angular velocity φdot (=dφ/dt) can be approximated by the following equation (1).

$$\varphi\text{dot} \approx \omega x + \cos \varphi \cdot \tan \theta \cdot \omega z \qquad (1)$$

The roll angular velocity estimator 11 calculates an estimation value of the roll angular velocity φdot using this equation (1) as a basic equation. The roll angular velocity estimator 11 acquires a detection value (current value) of the x-axis angular velocity ωx and a detection value (current value) of the z-axis angular velocity ωz based on the detection signal of the inertial sensor unit 3 in each arithmetic processing cycle. Additionally, the roll angular velocity estimator 11 acquires an estimation value (previous value φ) of the roll angle φ and an estimation value (previous value θ) of the pitch angle θ respectively calculated by the roll angle estimation value calculator 14 and the pitch angle estimator 13 in the previous arithmetic processing cycle.

Then, the roll angular velocity estimator 11 calculates an estimation value of the roll angular velocity φ by calculating the right side of the equation (1) using the detection value (current value) of the z-axis angular velocity ωz, the detection value (current value) of the z-axis angular velocity ωz, the estimation value (previous value φ) of the roll angle φ, and the estimation value (previous value θ) of the pitch angle θ.

Pitch Angle Estimator 13

ST33 in FIG. 3 is a block diagram illustrating processing contents of the pitch angle estimator 13. The vehicle speed V, cos θ, and an x-axis acceleration (ax) are input to the pitch angle estimator 13. The pitch angle estimator 13 estimates the pitch angle θ of the vehicle body 101 on the basis of the input signal.

Here, the vehicle speed V is based on the calculation from the front wheel speed and the detection signal corresponding to the rotational speed of the rear wheel of the motorcycle 100 output from the vehicle speed sensor 2. Additionally, cos θ is a cosine function value based on the previous pitch angle (θ) estimated by the arithmetic processing of the pitch angle estimator 13 in the previous arithmetic processing cycle. Additionally, the x-axis acceleration (ax) is based on a detection signal detected by the x-axis acceleration sensor 4x of the inertial sensor unit 3.

When processing in the roll angular velocity estimator 11 is expressed by a formula, the roll angular velocity φdot can be approximated by the following equation (2).

$$\theta = \sin^{-1}(V\text{dot} \cdot \cos \theta - ax) \qquad (2)$$

In the equation (2), Vdot is a time rate of change (=dV/dt: acceleration in X-axis direction) of the vehicle speed V in the X-axis direction of the vehicle body 101 viewed in the global coordinate system. The pitch angle estimator 13 calculates an estimation value of the pitch angle θ using the equation (2) as a basic equation. In each arithmetic processing cycle, the pitch angle estimator 13 acquires a time rate of change (time rate of change between current value and previous value) of the vehicle speed V based on the detection signal of the vehicle speed sensor 2, an estimation value (previous value) of the pitch angle θ calculated by the pitch angle estimator 13 in the previous arithmetic processing cycle, and a detection value (current value) of the x-axis acceleration ax based on the detection signal of the x-axis acceleration sensor 4x of the inertial sensor unit 3.

Then, the pitch angle estimator 13 calculates an estimation value of the pitch angle θ by calculating the right side of the equation (2) using the time rate of change (time rate of change between current value and previous value) of the vehicle speed V, the estimation value (previous value) of the pitch angle θ, and the detection value (current value) of the x-axis acceleration ax.

Correction Value Calculator 12

ST32 in FIG. 3 is a block diagram illustrating processing contents of the correction value calculator 12. The correction value calculator 12 calculates a correction value δ for reducing an error in the estimation value of the roll angle φ of the vehicle body 101. Basically, the roll angle ω of the vehicle body 101 can be estimated by integrating the estimation value of the roll angular velocity φdot calculated by the roll angular velocity estimator 11. However, if the calculation processing of the roll angle estimation value is performed in consideration of the estimation value in a transient state, error components may accumulate, and the error of the roll angle estimation value may easily increase. For this reason, when outputting the calculated correction value δ, the correction value calculator 12 determines whether the traveling state of the motorcycle 100 is a steady state or an unsteady state (transient state) such as a drift state or a jumping state, and changes the setting of an output gain K3 of the correction value according to the determination result.

The correction value calculator 12 sequentially calculates a correction value for estimating the roll angle of the vehicle body by using the variable correction coefficient K3 set according to the absolute value (time rate of change) of the differential value of the angular velocity in the direction around the z axis detected by the inertial sensor unit 3, the detection value of the speed by the speed sensor, each of the detection values of the z-axis angular velocity and the y-axis acceleration, the previous estimation value of the roll angle, and the previous estimation value of the pitch angle.

The z-axis angular velocity (ωz), the y-axis acceleration (ay_lyout: hereinafter referred to as ay), cos θ, sin φ, and the vehicle speed V are input to the correction value calculator 12. Here, the z-axis angular velocity (ωz) is based on the detection signal detected by the z-axis angular velocity sensor 5z of the inertial sensor unit 3. The y-axis angular velocity (ay) is based on a detection signal detected by the y-axis acceleration sensor 4z of the inertial sensor unit 3. Here, cos θ is a cosine function value based on the previous pitch angle (θ) estimated by the arithmetic processing of the pitch angle estimator 13 in the previous arithmetic processing cycle. Additionally, sin φ is a sine function value based on the previous roll angle (φ) estimated by the arithmetic processing of the roll angle estimation value calculator 14 in the previous arithmetic processing cycle. Additionally, the vehicle speed V is based on the calculation from the front wheel speed and the detection signal corresponding to the rotational speed of the rear wheel of the motorcycle 100 output from the vehicle speed sensor 2.

Figure 4:
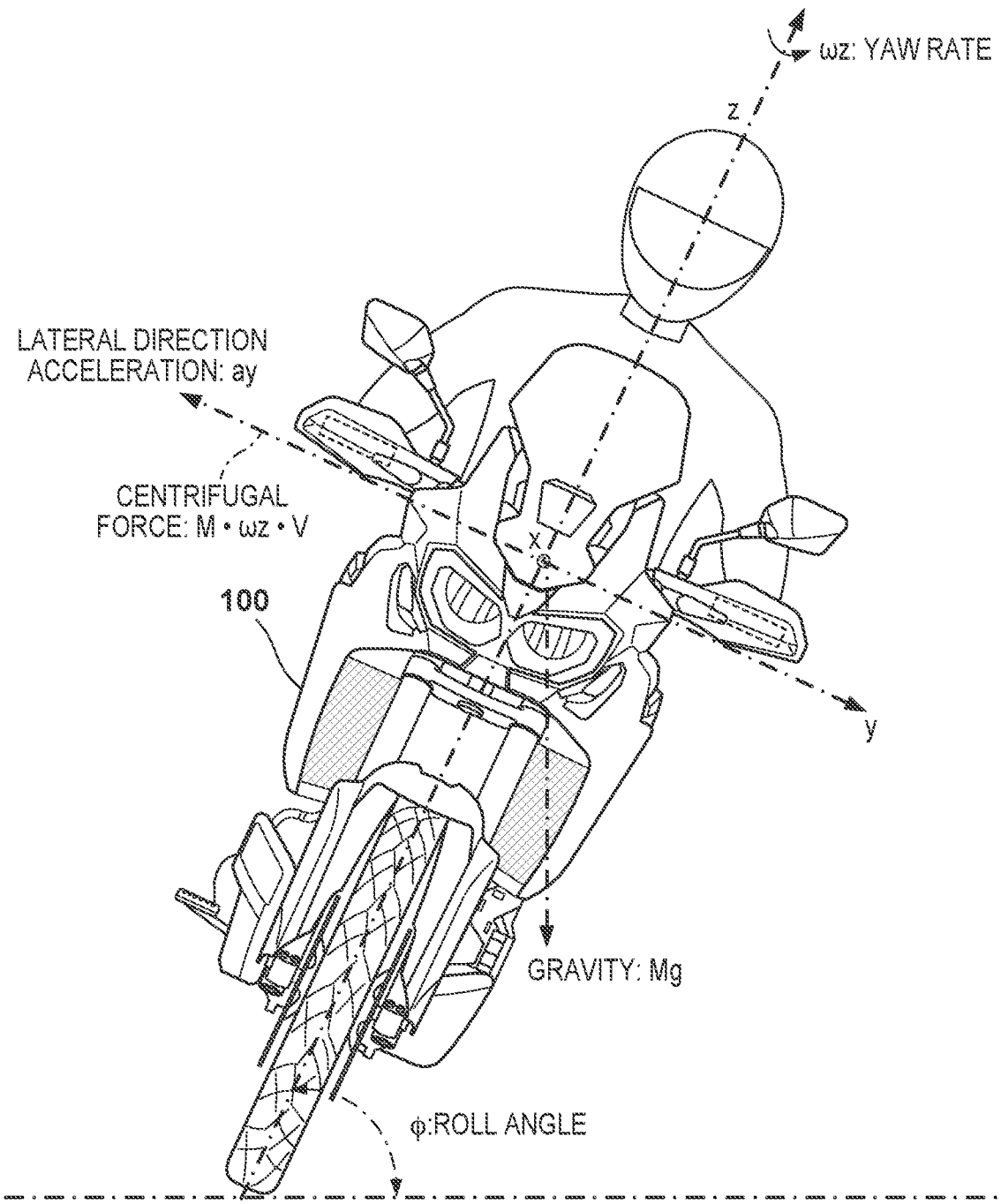
FIG. 4 is a diagram illustrating forces acting on a motorcycle during turning.

FIG. 4 is a diagram illustrating forces acting on the motorcycle 100 during steady turning. In the block diagram of ST32, Ay is the acceleration in the Y-axis direction of the vehicle body 101 viewed in the global coordinate system, and is a parameter corresponding to the acceleration in the Y-axis direction due to the centrifugal force expressed by the following equation (3).

$$Ay = \omega z \cdot V \quad (3)$$

In the block diagram of ST32, ay_estm is an estimation value of the y-axis acceleration, and the estimation value ay_estm of the y-axis acceleration during the steady turning can be calculated by the following equation (4) by using the detection value (current value) of the z-axis angular velocity ωz based on the detection signal of the inertial sensor unit 3, the estimation value (previous value) of the pitch angle θ estimated in the previous arithmetic processing cycle, and the estimation value (previous value) of the roll angle φ. In the equation (4), g represents gravitational acceleration.

$$ay\_estm = \omega z \cdot V + \cos\theta \cdot \sin\varphi \cdot g \quad (4)$$

In the block diagram of ST32, the value of the y-axis acceleration ay is detected by the y-axis acceleration sensor 4z of the inertial sensor unit 3, and when the error of the estimation value of the roll angle φ is not included in the estimation value ay_estm of the y-axis acceleration calculated by the equation (4), the relationship of the following equation (5) is established.

$$ay \approx \omega z \cdot V + \cos\theta \cdot \sin\varphi \cdot g \quad (5)$$

In the equation (5), a deviation err (ay-ay_estm) between ay and ay_estm corresponds to the error of the estimation value of the roll angle φ in a steady state.

The correction value calculator 12 calculates a bias deviation (K3·err) obtained by multiplying the deviation err (=ay-ay_estm) by the variable correction coefficient value K3. Here, the variable correction coefficient K3 is a coefficient value that is variably set according to the traveling state of the motorcycle 100. The correction value calculator 12 functions as a state determination unit that determines the traveling state of the straddle type vehicle by comparing a parameter (e.g., absolute value of differential value of z-axis angular velocity (ωz), sum of detection values of a plurality of acceleration sensors, and the like) calculated on the basis of the detection value detected by the inertial sensor unit 3 (detection unit) with a threshold. The correction value calculator 12 sequentially calculates a correction value for estimating the roll angle of the vehicle body on the basis of the variable correction coefficient set according to the determination result and the detection values of the speed sensor and the inertial sensor unit 3 (detection unit). That is, the correction value calculator 12 sequentially calculates the correction value δ for estimating the roll angle of the vehicle body on the basis of the following equation (6) using the bias deviation multiplied by the variable correction coefficient K3 set according to the determination result.

The correction value calculator 12 calculates the correction value δ so that the deviation err (=ay-ay_estm) in the steady state approaches zero on the basis of the equation (6). In the equation (6), K1 and K2 are preset fixed correction coefficient values. Predetermined constant values are set for the fixed correction coefficients K1 and K2 regardless of the traveling state of the motorcycle 100.

$$\delta = K1 \cdot (K3 \cdot (ay - ay\_estm)) + K2 \cdot \int (K3 \cdot (ay - ay\_estm)) dt \quad (6)$$

In the equation (6), the term of the fixed correction coefficient K2 corrects an offset component that is a deviation from the zero point included in the estimation value of the roll angle (q) in a normal traveling state (steady state).

The variable correction coefficient K3 is a coefficient whose value can be variably set on the basis of a parameter indicating the traveling state of the motorcycle 100. The parameter indicating the traveling state includes, for example, an absolute value of a differential value of the z-axis angular velocity (ωz), and the correction value calculator 12 can set the variable correction coefficient K3 according to the absolute value (time rate of change) of the differential value of the z-axis angular velocity (ωz).

Figures 5, 6:
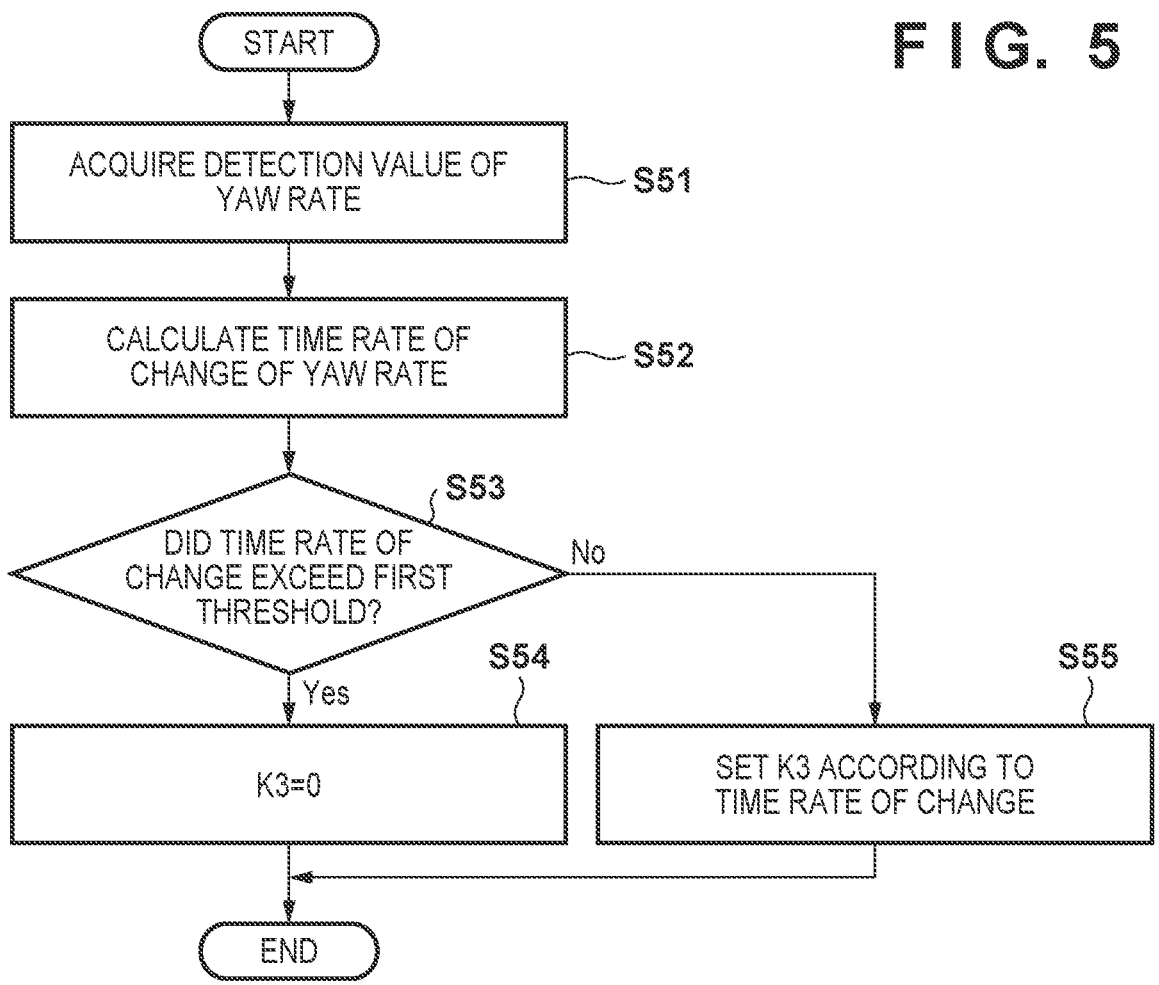
FIG. 5 is a diagram for explaining a flow of a method of setting a variable correction coefficient K3.
FIG. 6 is a diagram illustrating a table of a storage.

FIG. 5 is a diagram for describing a flow of a method of setting the variable correction coefficient K3. First, in step S51, the correction value calculator 12 acquires a detection value (previous value) of the z-axis angular velocity ωz and the detection value (current value) of the z-axis angular velocity ωz on the basis of the detection signal of the inertial sensor unit 3 in each arithmetic processing cycle.

Then, in step S52, the correction value calculator 12 calculates the absolute value (time rate of change) of the differential value of the z-axis angular velocity ωz in an arithmetic processing cycle (ΔT) on the basis of the difference between the detection value (previous value) of the z-axis angular velocity ωz and the detection value (current value) of the z-axis angular velocity ωz.

In step S53, the correction value calculator 12 compares the calculated absolute value (time rate of change) of the differential value of the z-axis angular velocity ωz with a preset first state determination threshold (first threshold). Here, the first state determination threshold (first threshold) is a threshold for determining whether or not the traveling state of the motorcycle 100 is an unsteady state (transient state) such as a drift state. The correction value calculator 12 determines that the traveling state of the motorcycle 100 is the transient state such as a drift state when the absolute value (time rate of change) of the differential value of the z-axis angular velocity ωz exceeds the first state determination threshold. Note that the first state determination threshold (first threshold) is stored in advance in the storage 62, and the correction value calculator 12 can acquire the first state determination threshold (first threshold) from the storage 62 at the time of arithmetic processing.

In the determination in step S53, if the absolute value (time rate of change) of the differential value of the z-axis angular velocity ωz exceeds the first state determination threshold (Yes in S53), the correction value calculator 12 sets the variable correction coefficient K3 to zero (K3=0).

When the parameter (absolute value of differential value of z-axis angular velocity ωz) exceeds the threshold, the correction value calculator 12 sets variable correction coefficient K3 so as to reduce the correction value. That is, when the absolute value (time rate of change) of the differential value of the z-axis angular velocity ωz exceeds the first state determination threshold and the traveling state of the motorcycle 100 is determined to be the transient state, the correction value calculator 12 sets the value of the variable correction coefficient K3 to zero so as to cancel the correction effect.

On the other hand, if the absolute value (time rate of change) of the differential value of the z-axis angular velocity ωz is equal to or less than the first state determination threshold in the determination of step S53 (No in S53), the correction value calculator 12 advances the processing to step S55.

Then, in step S55, the correction value calculator 12 can set the variable correction coefficient K3 according to the time rate of change. The correction value calculator 12 sets the variable correction coefficient K3 so as to reduce the correction value δ in accordance with an increase in the absolute value (time rate of change) of the differential value of the z-axis angular velocity ωz.

When the variable correction coefficient K3 is set, a table 600 in which the absolute value of the differential value of the z-axis angular velocity ωz and the corresponding variable correction coefficient K3 are associated in advance can be stored in the storage 62 (ROM 62*a*). In this case, the correction value calculator 12 can refer to the table of the storage 62, acquire the variable correction coefficient K3 corresponding to the absolute value (time rate of change) of the differential value of the calculated z-axis angular velocity ωz from the table 600, set the variable correction coefficient K3 in the equation (6), and output the correction value δ multiplied by the variable correction coefficient K3 acquired from the table.

FIG. 6 is a diagram illustrating the table 600 of the storage 62 (ROM 62*a*). As illustrated in FIG. 6, a plurality of values (ωz_dot_1, ωz_dot_2, ωz_dot 3, . . . ωz_dot_6) are set as absolute values of the differential values of the z-axis angular velocity ωz (yaw rate). The absolute value of the differential value is set such that the value of ωz_dot_1 is small and increases to ωz_dot_2, ωz_dot_3, ωz_dot_4, ωz_dot_5 . . . , and exceeds the first threshold (first state determination threshold) at ωz_dot_6.

Additionally, in the table 600, a plurality of values (K3_1, K3_2, K3_3 . . . ) are associated with the absolute values of the differential values of the z-axis angular velocity ωz (yaw rate) as the variable correction coefficient K3. In the table 600, the value of the variable correction coefficient K3 is set to decrease in value in accordance with an increase in the absolute value (time rate of change) of the differential value of the z-axis angular velocity ωz (yaw rate). That is, the set values decrease in the order of K3_1→K3_2→K3_3→K3_4→K3_5, and zero is set for the absolute value of the differential value of the z-axis angular velocity ωz (yaw rate) exceeding the first state determination threshold (K3_6=0). By setting the variable correction coefficient K3 to zero, the calculation result of the equation (6) for calculating the correction value δ becomes zero, and the output of the correction value δ for the calculation of estimating the roll angle φ can be canceled.

Note that the setting example of the table 600 is exemplary and is not limited to this example. Additionally, the parameter indicating the traveling state of the motorcycle 100 is not limited to the absolute value of the differential value of the z-axis angular velocity (ωz), and for example, it is also possible to determine whether or not the traveling state of the motorcycle 100 is in a transient state such as a jumping state on the basis of the sum of acceleration detection values of the plurality of acceleration sensors (4*x*, 4*y*, 4*z* in FIG. 2) included in the inertial sensor unit 3.

In this case, the correction value calculator 12 compares the sum of the acceleration detection values of the plurality of acceleration sensors detected by the inertial sensor unit 3 (detection unit) as a parameter with a preset second state determination threshold (second threshold). Here, the second state determination threshold (second threshold) is a threshold for determining whether or not the traveling state of the motorcycle 100 is in an unsteady state (transient state) such as a jumping state. The correction value calculator 12 determines that the traveling state of the motorcycle 100 is the transient state (unsteady state) such as a jumping state when the sum of the acceleration detection values of the plurality of acceleration sensors exceeds the second state determination threshold (second threshold), and the correction value calculator 12 sets the variable correction coefficient K3 to zero (K3=0). By setting the variable correction coefficient K3 to zero, the calculation result of the equation (6) for calculating the correction value δ becomes zero, and the output of the correction value δ for the calculation of estimating the roll angle φ can be canceled. The second state determination threshold (second threshold) is stored in advance in the storage 62, and the correction value calculator 12 can acquire the second state determination threshold (second threshold) from the storage 62 at the time of arithmetic processing.

On the other hand, when the sum of the acceleration detection values of the plurality of acceleration sensors is equal to or less than the second state determination threshold (second threshold), the correction value calculator 12 determines that the traveling state of the motorcycle 100 is a steady state, and sets 1 as the value of the variable correction coefficient K3. In this case, the correction value calculator 12 calculates the correction value δ on the basis of the equation (6), and the correction value calculator 12 inputs the calculation result to the roll angle estimation value calculator 14.

Roll Angle Estimation Value Calculator 14

ST34 in FIG. 3 is a block diagram illustrating processing contents of the roll angle estimation value calculator 14. The estimation value of the roll angular velocity φdot and the correction value δ are input to the roll angle estimation value calculator 14. The roll angle estimation value calculator 14 calculates an estimation value of the roll angle φ on the basis of the estimation value of the roll angular velocity φdot from the roll angular velocity estimator 11 and the calculated value of the correction value δ from the correction value calculator 12. In each arithmetic processing cycle, the roll angle estimation value calculator 14 integrates a value (=φdot-δ) obtained by correcting the estimation value (current value) of the roll angular velocity φdot calculated by the roll angular velocity estimator 11 on the basis of the correction value δ (current value) calculated by the correction value calculator 12, thereby calculating a corrected estimation value of the roll angle φ.

Summary of Embodiment

The above embodiment discloses at least the following configurations.

Configuration 1. A body posture detection device according to the above embodiment is a body posture detection device (e.g., 1 of FIG. 2) that sequentially estimates a roll angle of a vehicle body (101 of FIG. 1) of a straddle type vehicle (e.g., 100 of FIG. 1) having an x axis extending in a longitudinal direction of the vehicle body, a y axis extending in a vehicle width direction of the vehicle body, and a z axis extending in a vertical direction of the vehicle body as a coordinate system fixed to the vehicle body, the body posture detection device including:

a speed sensor (e.g., 2 of FIG. 2) that detects a speed of the vehicle body in a traveling direction;

a detection unit (e.g., 3 of FIG. 2) including a plurality of acceleration sensors (e.g., 4*x*, 4*y*, 4*z* of FIG. 2) corresponding to axes that detect translational acceleration in directions of the x axis, the y axis, and the z axis, and a plurality of angular velocity sensors (e.g., 5*x*, 5*z* of FIG. 2) corresponding to axes that detect angular velocity in a direction around the x axis and angular velocity in a direction around the z axis;

a pitch angle estimation unit (e.g., 13 of FIG. 2) that sequentially estimates a pitch angle of the vehicle body;

a roll angular velocity estimation unit (e.g., 11 of FIG. 2) that sequentially estimates a roll angular velocity of the vehicle body;

a state determination unit (e.g., 12 of FIG. 2) that determines a traveling state of the straddle type vehicle by comparing a parameter calculated on the basis of a detection value detected by the detection unit with a threshold;

a correction value calculation unit (e.g., 12 of FIG. 2) that sequentially calculates a correction value for estimating a roll angle of the vehicle body on the basis of a variable correction coefficient set according to the determination of the state determination unit and detection values of the speed sensor and the detection unit; and a roll angle estimation value calculation unit (e.g., 14 of FIG. 2) that calculates an estimation value of a current roll angle of the vehicle body by integrating a value obtained by correcting the estimation value of the roll angular velocity on the basis of the correction value, in which the correction value calculation unit (12) sets the variable correction coefficient (K3) so as to reduce the correction value when the parameter exceeds the threshold.

According to the body posture detection device of Configuration 1, it is possible to calculate the correction value using the variable correction coefficient set according to the traveling state of the vehicle, and estimate the roll angle on the basis of the calculated correction value.

Configuration 2. In the body posture detection device according to the embodiment, the correction value calculation unit (12) calculates the correction value using the variable correction coefficient, a detection value of the speed by the speed sensor, each of detection values of the z-axis angular velocity and the y-axis acceleration by the detection unit, a previous estimation value of the roll angle, and a previous estimation value of the pitch angle.

Configuration 3. In the body posture detection device according to the embodiment, the correction value calculation unit (12) calculates a time rate of change of the angular velocity in the direction around the z axis detected by the detection unit as the parameter, acquires a first threshold as the threshold, and sets the variable correction coefficient (K3) on the basis of a comparison between the time rate of change and the first threshold.

According to the body posture detection devices of Configurations 2 and 3, it is possible to calculate the correction value using the variable correction coefficient set according to the traveling state of the vehicle.

Configuration 4. In the body posture detection device according to the embodiment, the correction value calculation unit (12) sets the value of the variable correction coefficient to zero so as to set the correction value to zero when the time rate of change exceeds the first threshold.

According to the body posture detection device of Configuration 4, when the time rate of change exceeds the first threshold, the traveling state of the vehicle is regarded as a transient state such as a drift state, and the value of the variable correction coefficient is set to K3=0 such that the correction value becomes zero, whereby the output of the correction value in the transient state can be canceled. As a result, an error in the estimation value of the roll angle in the sequential operation can be reduced, and the estimation accuracy can be further improved.

Configuration 5. The body posture detection device according to the embodiment further includes storage unit (e.g., 62, 62*a* of FIG. 2) that stores a time rate of change of the angular velocity in the direction around the z axis and a value of the variable correction coefficient, and when the calculated time rate of change is equal to or less than a threshold, the correction value calculation unit (12) acquires the variable correction coefficient corresponding to the time rate of change from the storage unit (62, 62*a*), and outputs a correction value multiplied by the variable correction coefficient acquired from the storage unit (62, 62*a*).

Configuration 6. In the body posture detection device according to the embodiment, the storage unit (62, 62*a*) stores the variable correction coefficient set to decrease in value in accordance with an increase in the time rate of change.

According to the body posture detection devices of Configurations 5 and 6, by setting the variable correction coefficient corresponding to the time rate of change with reference to the storage unit, it is possible to reduce the error of the estimation value of the roll angle in the sequential operation and to further improve the estimation accuracy while speeding up the processing by the sequential operation.

Configuration 7. In the body posture detection device according to the embodiment, the correction value calculation unit (12) calculates a sum of detection values of the plurality of acceleration sensors (4*x*, 4*y*, 4*z*) detected by the detection unit (3) as the parameter, acquires a second threshold as the threshold, and sets the variable correction coefficient on the basis of a comparison between the sum and the second threshold.

According to the body posture detection device of Configuration 7, it is possible to calculate the correction value using the variable correction coefficient set according to the traveling state of the vehicle.

Configuration 8. In the body posture detection device according to the embodiment, the correction value calculation unit (12) sets the value of the variable correction coefficient to zero so as to set the correction value to zero when the sum exceeds the second threshold.

According to the body posture detection device of Configuration 8, when the sum exceeds the second threshold, the traveling state of the vehicle is regarded as a transient state such as a jumping state, and the value of the variable correction coefficient is set to K3=0 such that the correction value becomes zero, whereby the correction value in the transient state can be canceled. As a result, an error in the estimation value of the roll angle in the sequential operation can be reduced, and the estimation accuracy can be further improved.

Configuration 9. In the body posture detection device according to the embodiment, the correction value calculation unit (12) sets 1 as the value of the variable correction coefficient when the sum is equal to or less than the second threshold.

According to the body posture detection device of Configuration 9, it is possible to calculate the correction value using the variable correction coefficient set according to the traveling state of the vehicle.

Configuration 10. In the body posture detection device of the embodiment, the pitch angle estimation unit (13) calculates an estimation value of a current pitch angle using a detection value of the speed by the speed sensor (2), a detection value of x-axis acceleration by the detection unit (3), and a previous estimation value of the pitch angle.

According to the body posture detection device of Configuration 10, it is possible to calculate the estimation value of the current pitch angle on the basis of the detection values of the speed sensor and the detection unit (inertial sensor unit) and the previous estimation value of the pitch angle.

Configuration 11. In the body posture detection device according to the embodiment, the roll angular velocity estimation unit (11) calculates an estimation value of a current roll angular velocity by using each of detection values of x-axis angular velocity and z-axis angular velocity by the detection unit, a previous estimation value of the roll angle, and a previous estimation value of the pitch angle by the pitch angle estimation unit.

According to the body posture detection device of Configuration 11, it is possible to calculate the estimation value of the current roll angular velocity using the detection value of the detection unit, the previous estimation value of the roll angle, and the previous estimation value of the pitch angle.

Configuration 12. A straddle type vehicle according to the embodiment includes the body posture detection device according to any one of Configurations 1 to 11 described above.

According to the straddle type vehicle of Configuration 12, it is possible to provide the straddle type vehicle including the body posture detection device capable of estimating the roll angle by setting the variable correction coefficient so as to reduce the correction value according to an increase in the time rate of change of the angular velocity indicating the traveling state of the vehicle.

The invention is not limited to the foregoing embodiments, and various variations/changes are possible within the spirit of the invention.

What is claimed is:

1. A body posture detection device that sequentially estimates a roll angle of a vehicle body of a straddle type vehicle having an x axis extending in a longitudinal direction of the vehicle body, a y axis extending in a vehicle width direction of the vehicle body, and a z axis extending in a vertical direction of the vehicle body as a coordinate system fixed to the vehicle body, the body posture detection device comprising:
   a speed sensor that detects a speed of the vehicle body in a traveling direction;
   a detection unit including a plurality of acceleration sensors corresponding to axes that detect translational acceleration in directions of the x axis, the y axis, and the z axis, and a plurality of angular velocity sensors corresponding to axes that detect angular velocity in a direction around the x axis and angular velocity in a direction around the z axis;
   a pitch angle estimation unit that sequentially estimates a pitch angle of the vehicle body;
   a roll angular velocity estimation unit that sequentially estimates a roll angular velocity of the vehicle body;
   a state determination unit that determines a traveling state of the straddle type vehicle by comparing a parameter calculated on the basis of a detection value detected by the detection unit with a threshold;
   a correction value calculation unit that sequentially calculates a correction value for estimating a roll angle of the vehicle body on the basis of a variable correction coefficient set according to the determination of the state determination unit and detection values of the speed sensor and the detection unit; and
   a roll angle estimation value calculation unit that calculates an estimation value of a current roll angle of the vehicle body by integrating a value obtained by correcting the estimation value of the roll angular velocity on the basis of the correction value, wherein
   the correction value calculation unit sets the variable correction coefficient so as to reduce the correction value when the parameter exceeds the threshold; and
   the roll angular velocity estimation unit calculates an estimation value of a current roll angular velocity $\dot{\varphi}$ using the equation $\dot{\varphi} \approx \omega x + \cos \varphi \cdot \tan \theta \cdot \omega z$, where $\omega x$ comprises the angular velocity in the direction around the x-axis, $\omega z$ comprises the angular velocity in the direction around the z-axis, $\cos \varphi$ is a cosine function value based on the previous estimation value of the roll angle $\varphi$, and $\tan \theta$ comprises a tangent function value based on the previous estimation value of the pitch angle $\theta$.

2. The body posture detection device according to claim 1, wherein the correction value calculation unit calculates the correction value using the variable correction coefficient, a detection value of the speed by the speed sensor, each of detection values of the z-axis angular velocity and the y-axis acceleration by the detection unit, a previous estimation value of the roll angle, and a previous estimation value of the pitch angle.

3. The body posture detection device according to claim 1, wherein the correction value calculation unit calculates a time rate of change of the angular velocity in the direction around the z axis detected by the detection unit as the parameter, acquires a first threshold as the threshold, and sets the variable correction coefficient on the basis of a comparison between the time rate of change and the first threshold.

4. The body posture detection device according to claim 1, wherein the correction value calculation unit calculates a sum of detection values of the plurality of acceleration sensors detected by the detection unit as the parameter, acquires a second threshold as the threshold, and sets the variable correction coefficient on the basis of a comparison between the sum and the second threshold.

5. The body posture detection device according to claim 1, wherein the pitch angle estimation unit calculates an estimation value of a current pitch angle using a detection value of the speed by the speed sensor, a detection value of x-axis acceleration by the detection unit, and a previous estimation value of the pitch angle.

6. A straddle type vehicle comprising the body posture detection device according to claim 1.

7. The body posture detection device according to claim 2, further comprising a storage unit that stores a time rate of change of the angular velocity in the direction around the z axis and a value of the variable correction coefficient, wherein
   the correction value calculation unit acquires the variable correction coefficient corresponding to the time rate of change from the storage unit, and outputs a correction value multiplied by the variable correction coefficient acquired from the storage unit.

8. The body posture detection device according to claim 3, wherein the correction value calculation unit sets the value of the variable correction coefficient to zero so as to set the correction value to zero when the time rate of change exceeds the first threshold.

9. The body posture detection device according to claim 4, wherein the correction value calculation unit sets the value of the variable correction coefficient to zero so as to set the correction value to zero when the sum exceeds the second threshold.

10. The body posture detection device according to claim 4, wherein the correction value calculation unit sets 1 as the value of the variable correction coefficient when the sum is equal to or less than the second threshold.

11. The body posture detection device according to claim 7, wherein the storage unit stores the variable correction coefficient set to decrease in value in accordance with an increase in the time rate of change.

* * * * *